W. H. MORRIS & H. HUDSON.
ADJUSTABLE ICE SHOE.
APPLICATION FILED SEPT. 23, 1911.
1,016,168.
Patented Jan. 30, 1912.
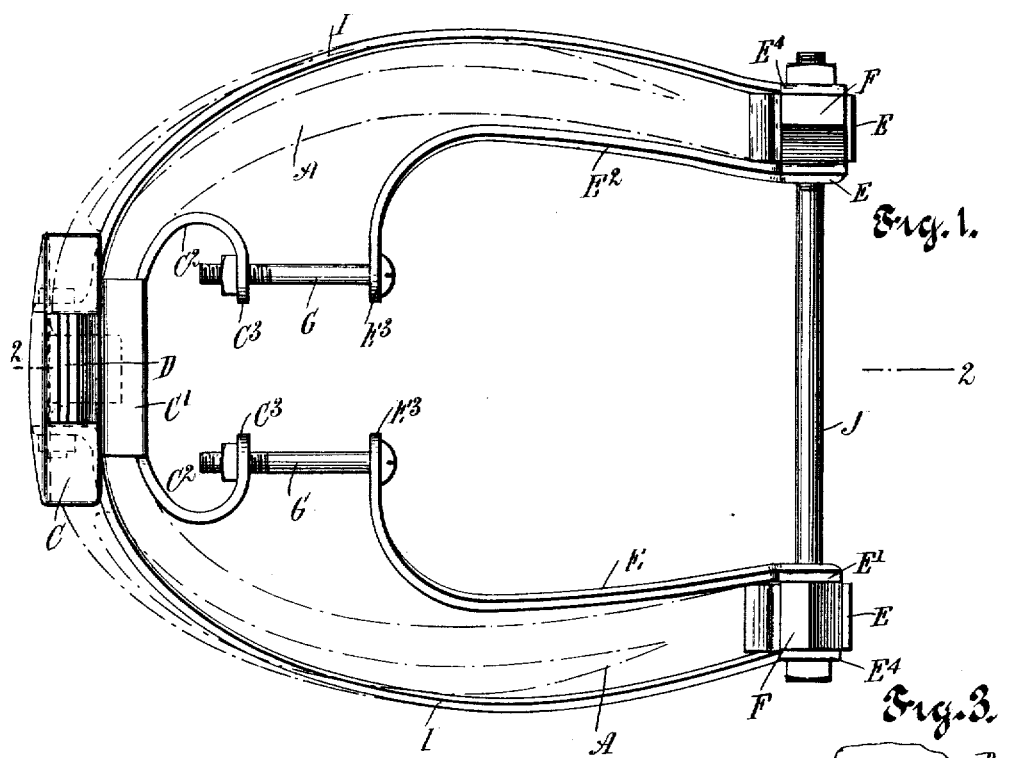
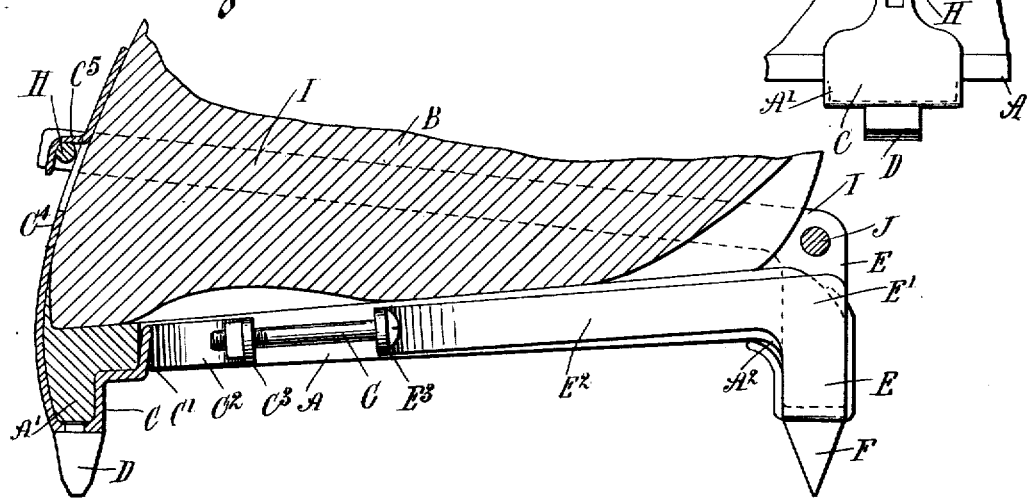
WITNESSES
INVENTORS
William H. Morris
Homer Hudson
BY
ATTORNEYS

UNITED STATES PATENT OFFICE.

WILLIAM H. MORRIS AND HOMER HUDSON, OF NASHVILLE, TENNESSEE.

ADJUSTABLE ICE-SHOE.

1,016,168.  Specification of Letters Patent.  Patented Jan. 30, 1912.

Application filed September 23, 1911. Serial No. 650,959.

*To all whom it may concern:*

Be it known that we, WILLIAM H. MORRIS and HOMER HUDSON, both citizens of the United States, and residents of Nashville, in the county of Davidson and State of Tennessee, have invented a new and Improved Adjustable Ice-Shoe, of which the following is a full, clear, and exact description.

The invention relates to horseshoes, and its object is to provide a new and improved adjustable ice shoe or a creeper arranged for convenient attachment to a horseshoe and the animal's hoof, and designed to prevent the animal from slipping when walking on icy or slippery roads.

A further object of the present invention is to provide an ice shoe or creeper which will be simple and durable in construction and composed of comparatively few parts which may be readily adjusted and securely placed in position on a horseshoe and an animal's hoof.

For the purpose mentioned use is made of auxiliary toe and heel calks mounted on caps fitting the ordinary toe and heel calks of the horseshoe, means for connecting the caps with each other within the opening of the horseshoe, and means for connecting the caps with each other around the animal's hoof.

A practical embodiment of the invention is represented in the accompanying drawings forming a part of this specification, in which similar characters of reference indicate corresponding parts in all the views.

Figure 1 is an inverted plan view of the adjustable ice shoe or creeper; Fig. 2 is a sectional side elevation of the same as applied, the section being on the line 2—2 of Fig. 1; and Fig. 3 is a front end view of the connection between the cap-carrying auxiliary toe calk and the band passing around the animal's hoof.

An ordinary horseshoe A attached by nails or other means to the animal's hoof B is provided with the usual toe calk A' and the heel calks A², and onto the said toe calk A' fits a cap C carrying an auxiliary toe calk D. Onto the heel calks A² of the horseshoe A fit caps E carrying auxiliary heel calks F, which latter as well as the auxiliary toe calk D are sufficiently sharpened to enable the animal to take a sure foothold on icy or slippery roads.

The cap C is provided at the inner side with an upward extension C' from which extend rearwardly integral straps C² having transverse terminals C³ and arranged within the opening of the horseshoe A. The auxiliary caps E are provided at the inner sides with upward extensions E' from which extend integral straps E² arranged within the opening of the horseshoe A and extending toward the straps C², the forward terminals of the straps E² extending transversely and being engaged by bolts G, which also engage the terminals C³ of the straps C², as will be readily understood by reference to Figs. 1 and 2. By the arrangement described, the caps C and E are adjustably connected with each other by means arranged within the opening of the horseshoe A.

The front of the cap C is provided with an upward extension C⁴ having a struck-up hook C⁵ engaging a transverse bolt H employed for connecting the front ends of straps I with each other, the said straps I extending rearwardly around the animal's hoof B to integrally connect at their rear ends with upward extensions E⁴ formed on the outer sides of the caps E. A transverse bolt J connects the rear ends of the bands I with each other immediately in the rear of the animal's hoof B, to permit of drawing the bands I tight around the animal's hoof, so as to securely hold the said bands in position, and thus hold the caps C and E against accidental disengagement from the calks A' and A² at the time the animal lifts the hoof B.

By reference to Fig. 1, it will be noted that the cutting edge of the toe calk A' extends transversely, and the cutting edge of one of the auxiliary heels calks F extends transversely while the other extends longitudinally, so as to prevent the animal from slipping lengthwise or transversely.

It is understood that by the use of the bolts G, H and J, the ice shoe or creeper can be securely fastened in position on the horseshoe A and the animal's hoof B, and the ice shoe or creeper can be readily fitted on shoes and hoofs of varying sizes.

Having thus described our invention, we claim as new and desire to secure by Letters Patent:

1. An adjustable ice shoe for horseshoes, comprising auxiliary toe and heel calks, caps carrying the said auxiliary calks and adapted to fit over the calks of the horseshoe, the said caps for the auxiliary toe and heel calks having straps arranged within the opening of the horseshoe, adjustable fastening devices connecting the straps with each other, an adjustable band connected with the caps of the auxiliary heel calks and adapted to extend around the animal's hoof, and a connection between the cap of the auxiliary toe calk and the front of the said band.

2. An adjustable ice shoe for horseshoes, comprising auxiliary toe and heel calks, caps carrying the said auxiliary calks and adapted to fit over the calks of the horseshoe, the said caps for the auxiliary toe and heel calks having straps extending toward each other within the opening of the horseshoe, bolts connecting the ends of the straps with each other, a sectional band attached to the caps of the auxiliary heel calks and adapted to encircle the animal's hoof, a front bolt adjustably connecting the front ends of the sectional band with each other, a rear bolt connecting the rear ends of the sectional band with each other, and a hook on the cap for the auxiliary toe calk and engaging the said front bolt.

In testimony whereof we have signed our names to this specification in the presence of two subscribing witnesses.

WILLIAM H. MORRIS.
HOMER HUDSON.

Witnesses:
ERLE T. HUDSON,
CHAS. E. ARMSTRONG.

---

Copies of this patent may be obtained for five cents each, by addressing the " Commissioner of Patents, Washington, D. C."